US008078738B2

(12) United States Patent
Dinkel et al.

(10) Patent No.: US 8,078,738 B2
(45) Date of Patent: *Dec. 13, 2011

(54) SYSTEMS AND METHODS FOR CALCULATING A DISTRIBUTION

(75) Inventors: Ralf Dinkel, Waibstadt-Daisbach (DE); Christine Hoffmann, Weinheim (DE); Ralf Kuehner, Kaiserslautern (DE); Manfred Metz, Karlsruhe (DE)

(73) Assignee: SAP AG, Walldorf (DE)

( * ) Notice: Subject to any disclaimer, the term of this patent is extended or adjusted under 35 U.S.C. 154(b) by 69 days.

This patent is subject to a terminal disclaimer.

(21) Appl. No.: 12/913,285

(22) Filed: Oct. 27, 2010

(65) Prior Publication Data
US 2011/0040715 A1 Feb. 17, 2011

Related U.S. Application Data

(63) Continuation of application No. 11/368,400, filed on Mar. 7, 2006, now Pat. No. 7,849,200.

(30) Foreign Application Priority Data

Mar. 18, 2005 (EP) ..................................... 05005943

(51) Int. Cl.
*G06F 15/16* (2006.01)
(52) U.S. Cl. ........ 709/228; 709/226; 709/223; 709/200; 709/201; 705/7; 705/36; 705/38
(58) Field of Classification Search .......... 709/201–203, 709/208–211, 217–219, 223–226, 232; 705/7–10, 705/36–38
See application file for complete search history.

(56) References Cited

U.S. PATENT DOCUMENTS

| 4,648,023 | A | | 3/1987 | Powell |
|---|---|---|---|---|
| 5,198,754 | A | * | 3/1993 | Binet ....................... 324/756.05 |
| 6,449,648 | B1 | * | 9/2002 | Waldo et al. .................. 709/226 |
| 6,654,814 | B1 | * | 11/2003 | Britton et al. .................. 709/246 |
| 6,799,208 | B1 | * | 9/2004 | Sankaranarayan et al. ... 709/223 |
| 2003/0105673 | A1 | * | 6/2003 | Dunbaugh et al. .............. 705/26 |
| 2004/0010592 | A1 | * | 1/2004 | Carver et al. .................. 709/226 |
| 2004/0064541 | A1 | * | 4/2004 | Ebata et al. ................... 709/223 |
| 2004/0073694 | A1 | * | 4/2004 | Frank et al. ................... 709/232 |

* cited by examiner

*Primary Examiner* — Wing Chan
*Assistant Examiner* — Benjamin M Thieu
(74) *Attorney, Agent, or Firm* — Finnegan, Henderson, Farabow, Garrett & Dunner

(57) ABSTRACT

Systems and methods are provided for calculating a distribution of a quantity over a number of receiver objects. In one implementation, a data processing system is provided that comprises a number of application programs, each of the application programs being adapted to generate a distribution request, storage means for storing a number of rules, each rule being adapted for distribution of at least a portion of the quantity over the receiver objects and for storing an assignment of a sub-set of the rules to each application program, each rule within one of the sub-sets of rules having an assigned priority of execution and each sub-set of rules having an assigned identifier. The data processing system may also comprise distribution calculation means for receiving the distribution request from one of the application programs, the distribution request comprising the identifier of the sub-set of rules assigned to the one of the application programs, the quantity to be distributed, and the identifiers of receiver objects over which the quantity is to be distributed, the distribution calculation means being adapted to access the storage means for execution of the sub-set of rules assigned to the one of the application programs in the order of the priorities assigned to the rules within the sub-set of rules.

15 Claims, 4 Drawing Sheets

SYSTEMS AND METHODS FOR CALCULATING A DISTRIBUTION

This is a continuation of application Ser. No. 11/368,400, filed Mar. 7, 2006 now U.S. Pat. No. 7,849,200 (allowed), which claims the benefit of European Patent Application No. 05005943.5, filed Mar. 18, 2005, all of which are incorporated herein by reference.

TECHNICAL FIELD

The present invention generally relates to the field of data processing. More particularly, and without limitation, the invention relates to the calculation of a distribution of a quantity over a number of receiver objects.

BACKGROUND INFORMATION

The calculation of a distribution of a quantity over a number of receiver objects is a common data processing task. For example, in a manufacturing environment, certain manufacturing resources need to be distributed to manufacturing receiver objects. In a chemical production plant, a certain chemical substance, i.e., the quantity to be distributed, needs to be distributed over a number of chemical reactors. The distribution of the chemical substance over the chemical reactors can depend on certain parameters, such as the actual operational states and environmental conditions of the chemical reactors. Other examples where manufacturing resources need to be distributed include the distribution of energy, gas, electricity, and/or heat to receiver objects that require these resources.

The calculation of distributions is also a common task in financial data processing systems and enterprise resource planning (ERP) systems. In such systems, the quantity to be distributed is typically a cost value. For example, the cost for operating a company's cafeteria may need to be distributed over the cost centers of the company in accordance with a certain distribution scheme.

Likewise, production costs need to be distributed over the final products. These and other common distribution calculations may be performed by special application programs, such as manufacturing control programs, financial data processing programs or other application programs.

SUMMARY

In accordance with an embodiment of the present invention, a data processing system is provided for calculating a distribution of a quantity over a number of receiver objects. The data processing system has a number of application programs that can generate distribution calculation requests. A number of rules are stored in the data processing system. Each rule is adapted to calculate a distribution of at least a portion of the quantity to be distributed. A sub-set of the rules is stored for each application program and each rule within one of the sub-sets of the rules has an assigned priority of execution. The sub-set of rules has an assigned identifier.

The data processing system may include distribution calculation means for receiving the distribution calculation request from one of the application programs. The distribution calculation request may include the identifier of the sub-set of the rules assigned to the application program. In one embodiment, the identifier identifies a set of receiver objects over which the quantity is to be distributed. The distribution calculation means uses the identifier of the sub-set of rules in order to access the sub-set of rules assigned to the application program. The distribution calculation means may execute the rules contained in this sub-set in the order of the priorities assigned to the rules.

Embodiments of the present invention may facilitate to provide a flexible framework or "hub" that can be used by a number of application programs. This may avoid a need to program a specific distribution logic into each of the application programs. Rather, the data processing system consistent with embodiments of the invention can provide a flexible framework that can be adjusted to the data processing requirements as far as the calculation of distributions is concerned for a number of application programs. Further, this enables to make more efficient use of the available data processing resources as multiple investments in distribution processing functionalities can be avoided.

In accordance with another embodiment of the present invention, at least some of the rules are parameterizable. Preferably, at least some of the parameter values are adjusted when the sub-set of the rules for a given application program is persistently stored. The remainder of the parameter values can be unknown at the time when the sub-set of the rules is stored. In this instance, the parameterization of the rule is completed after the application program has requested the distribution calculation from the distribution calculation means. In response to the distribution calculation request, the distribution calculation means requests the parameter values of the rule parameters that still require parameterization from the application program. The application program returns these parameter values to the distribution calculation means such that the respective rule can be executed.

In accordance with yet another embodiment of the invention, the distribution calculation means can generate a table containing the distribution result per receiver object. The distribution calculation means returns the table to the requesting application program. The requesting application program can perform further data processing steps on the distribution result and/or store the distribution result in a database.

According to a further embodiment of the present invention, the data processing system is coupled to a manufacturing control system, such as for the production of integrated circuit chips. The production yields two different quality classes of chips: the normal quality of chips is operable at a normal frequency and the higher quality class of chips is operable at a frequency that is substantially higher than the normal frequency. The fixed and variable production costs need to be distributed over the chips. This is done by means of rules such that the higher quality chips receive a higher proportion of the manufacturing cost in order to reflect the higher quality and thus higher value of the chips.

Embodiments of the present invention further relate to methods for calculating a distribution of a quantity over a number of receiver objects, as well as computer program products for calculating a distribution of a quantity over a number of receiver objects.

Embodiments of the present invention are not limited to any particular industry, but are broadly applicable to all data processing applications that require the calculation of distributions.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
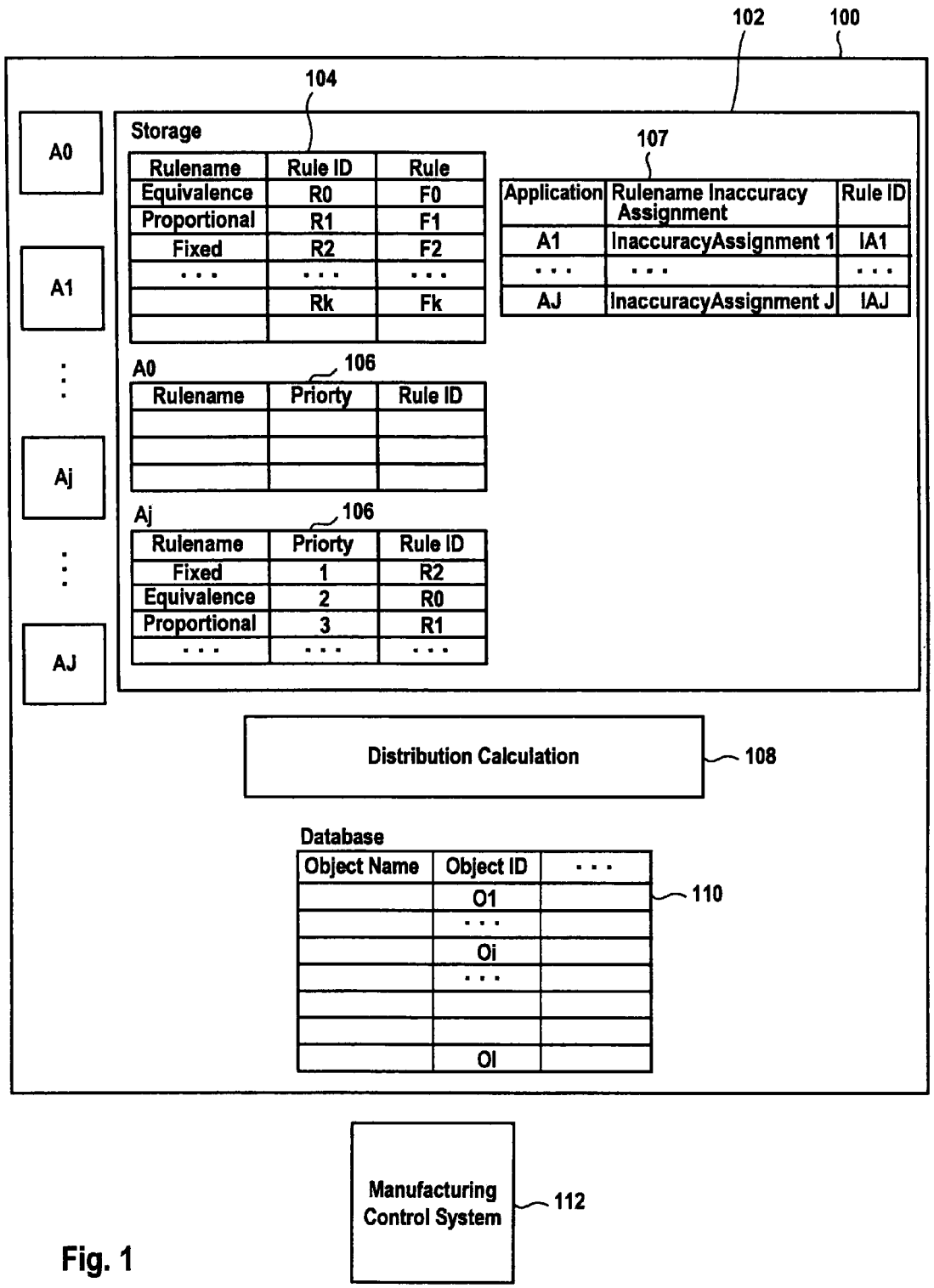
FIG. 1 is a block diagram of an exemplary data processing system, consistent with an embodiment of the present invention.

FIG. 1 shows an exemplary data processing system 100. The data processing system 100 includes a number of J application programs A0, A1, Aj, AJ. Further, the data processing system 100 has a storage component 102 for persistently storing a customizing table 104. The customizing table 104 holds a number of distribution rules. Each distribution rule is identified by its rule name, rule identifier (ID) and the rule itself, i.e., a calculation routine. In one embodiment, the customizing table 104 contains a rule 'equivalence' having the rule ID R0 and calculation routine F0. The rule 'equivalence' serves for distribution of a quantity in accordance with equivalence numbers. These equivalence numbers are parameters of the calculation routine F0.

For example, the calculation routine F0 may be based on the following formula:

$$\text{Distribution weight}(i) = \frac{\text{Output}(i) * \text{Equi}(i)}{\sum_{j=1}^{n} \text{Output}(j) * \text{Equi}(j)}$$

where n is the number of product classes, output (i) is the total number of products of the product class (i), and Equi (i) is the equivalence number of the product class (i).

The calculation of the distribution of the quantity may be performed by calculating the distribution weight for each product class. The distribution result for the product class (i) is obtained as follows:

$$\text{Distribution result}(i) = \text{Quantity} * \text{Distribution weight}(i)$$

The customizing table 104 also contains a rule 'proportional' that has rule ID R1 and calculation routine F1. The 'proportional' rule distributes a quantity in proportion to, e.g., the respective outputs of each product class.

The rule 'fixed' has the assigned rule ID R2 and calculation routine F2. The rule 'fixed' serves to distribute a fixed amount of the quantity to be distributed to each receiver object.

As shown in FIG. 1, the customizing table 104 contains a total of K rules having rule IDs R0, R1, R2, Rk, RK.

In addition to customizing table 104, there is a customizing table 106 for each of the application programs A0 to AJ. Without limitation and for purposes of illustration, the customizing table assigned to the application program Aj is considered below in the following by way of example.

The customizing table 106 of the application program Aj contains a sub-set of the rules of customizing table 104. In the example considered here, the sub-set of rules contains the rules R0, R1 and R2. A priority of execution is assigned to each of the rules contained in the sub-set of rules. For example, the rule R2 has the priority of execution 1, rule R0 has the priority of execution 2, and the rule R1 has the priority of execution 3. These priorities can be different in other customizing table 106 of other application programs.

The data processing system 100 further includes a distribution calculation component 108 for calculation of a distribution of a quantity.

After calculation of a distribution on request of an application by means of the rules specified in the respective application specific table 116 (shown in FIGS. 2 and 3), there may be a residual that has not been distributed, e.g., due to rounding errors or due to other inaccuracies of the numeric calculations. The residual also needs to be distributed for complete distribution of the quantity.

Table 107 in the example of FIG. 1 may store a rule for each of the applications that determines how such a residual is to be distributed, e.g., to one specific receiver object, evenly distributed over all receiver objects identified in the table 116 (shown in FIGS. 2 and 3) of the requesting application, to alternating receiver objects, or otherwise.

Further, the data processing system 100 has a database 110 for storage of object names, object IDs and object attributes, object properties and/or values assigned to an object, e.g., a numeric value being representative of a quantity to be distributed and/or a distribution result.

In one embodiment, there is a number of I objects O1, Oi, OI. At least some of the objects can act as sender objects and/or receiver objects as far as the distribution of a quantity is concerned. A sender objects is considered as the originator of the quantity whereas receiver objects are considered as the recipients of the distribution result.

The data processing system 100 may be coupled to a manufacturing control system 112 for controlling a manufacturing facility, such as a chemical production plant or a wafer fab. The manufacturing control system 112 can provide parameter values e.g., output (i) to the application programs A0 to AJ.

Figure 2:
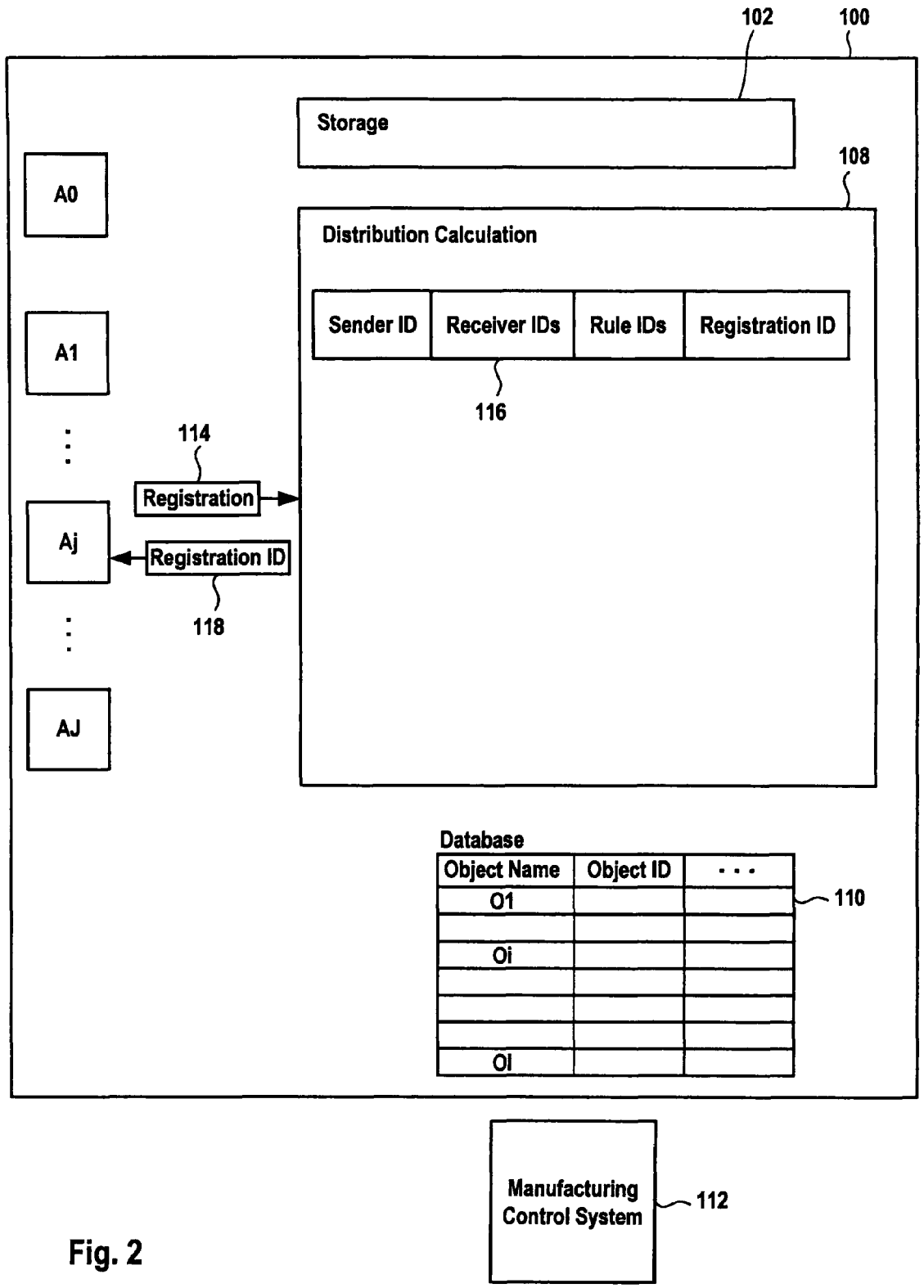
FIG. 2 is the block diagram of the data processing system of FIG. 1 illustrating a registration phase, consistent with an embodiment of the present invention.

Before a distribution of a quantity can be calculated, a registration of each application program with the distribution calculation component 108 may be required. FIG. 2 illustrates the registration of the application Aj by way of example.

The application program Aj sends a registration request 114 to the distribution calculation component 108. The registration request 114 contains the sender ID and at least two receiver IDs to identify the receiver objects over which the quantity is to be distributed.

Further, the registration request 114 contains at least a sub-set of the rule IDs contained in the customizing table 106 of the application program Aj (cf. FIG. 1). For example, each receiver ID is assigned to one or more of these rule IDs by the registration request 114.

In addition, the registration request 114 can contain one or more parameter values for at least partly parameterizing the rules identified in the registration request 114. For example, the registration request 114 can contain the equivalence numbers e.g., Equi (i) for the rule F0 (cf. FIG. 1) but not the outputs (i) as the actual output numbers vary and can thus not be subject of registration.

The information contained in the registration request 114 may be persistently stored as a table 116 or other data structure by the distribution calculation component 108. The table 116 is identified by a registration ID. The registration ID is returned by means of response 118 from the distribution calculation component 108 to the application program Aj. This concludes the registration phase.

Figure 3:
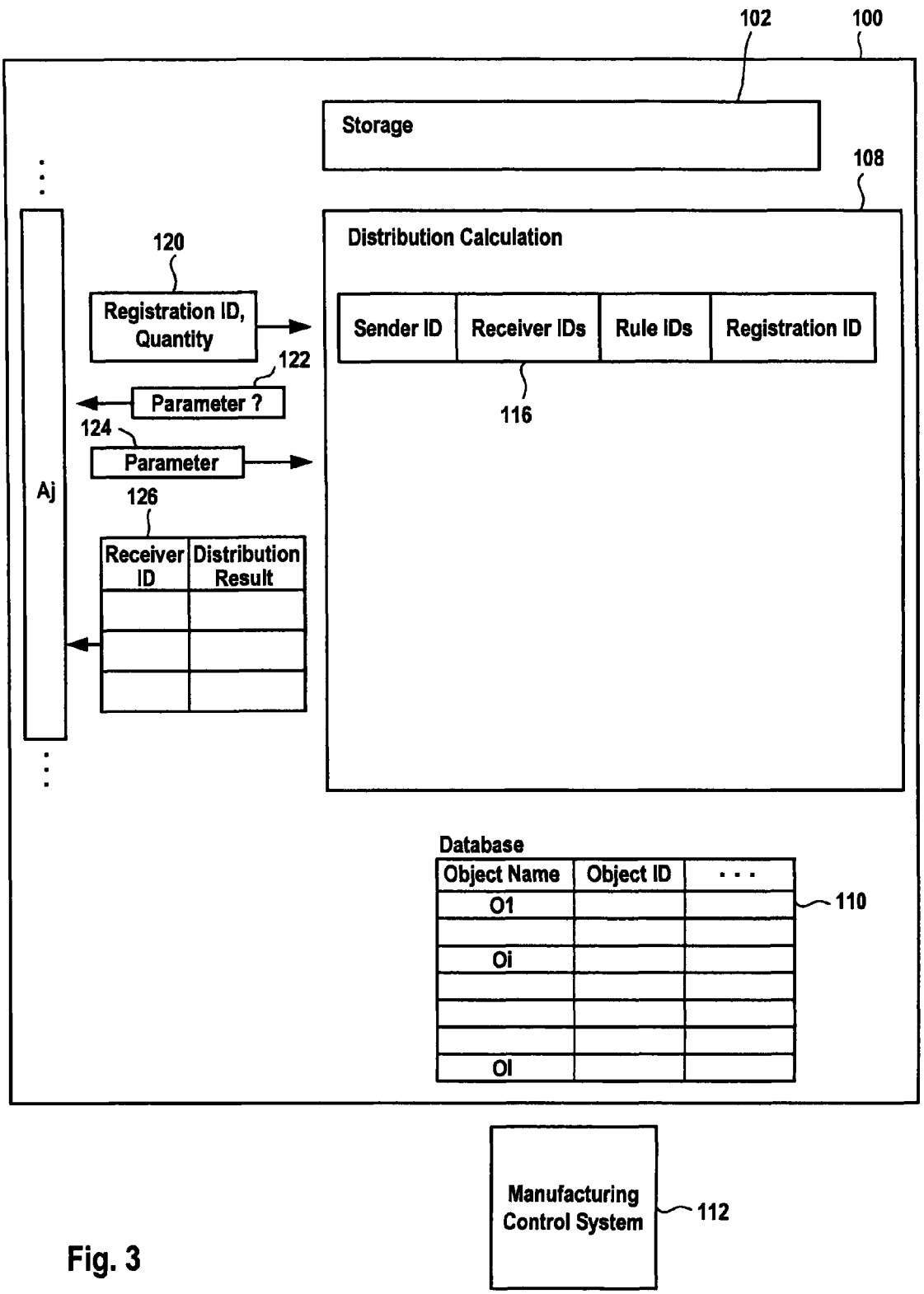
FIG. 3 is a block diagram of the exemplary data processing system of FIGS. 1 and 2 illustrating a distribution calculation phase, consistent with an embodiment of the present invention.

FIG. 3 illustrates an exemplary calculation of a distribution, consistent with an embodiment of the present invention. In order to initiate a distribution calculation, the application program Aj may send a request 120 to the distribution calculation component 108. The request 120 contains the registration ID of the table 116 and the quantity to be distributed. If necessary, the distribution calculation component 108 sends a request 122 to the application program Aj in order to request additional parameter values that are required in order to complete the parameterization of the rules identified by the table 116.

For example, the request 122 is required in order to obtain the actual output values from the application program Aj in order to execute the rule F0.

The application program Aj sends a response 124 to the distribution calculation component 108. The response 124 contains the parameter values as requested by the distribution calculation component 108 in its request 122, such as the output values for execution of the rule F0.

After the distribution calculation component 108 has completed the parameterization of all rules identified in the table 116, it may execute the rules starting with the rule having the highest priority. Depending on the implementation, the highest priority rule is applied to those receiver IDs to which it is assigned in the table 116 or to all receiver IDs in table 116. After execution of the highest priority rule, the residual of the quantity that has not yet been distributed is distributed by the next lower priority rule. Again this distribution can be performed with respect to all receiver objects identified in the table 116 or with respect to those receiver objects to which the second highest priority rule is assigned in the table 116. The residual that remains after execution of the second highest priority rule is then distributed using the third highest priority rule, etc. until all rules have been executed. Any residual that might still remain after application of all rules, e.g., due to rounding errors, can be distributed over the receiver objects identified in the table 116 in accordance with a globally applicable predefined rule.

As a result of the distribution calculation, each receiver ID identified in the table 116 may receive a portion of the quantity as a distribution result. The distribution calculation component 108 may generate a table 126 that contains the distribution results per receiver object. The application program Aj can store the distribution results in, for example, the database 110.

Figure 4:
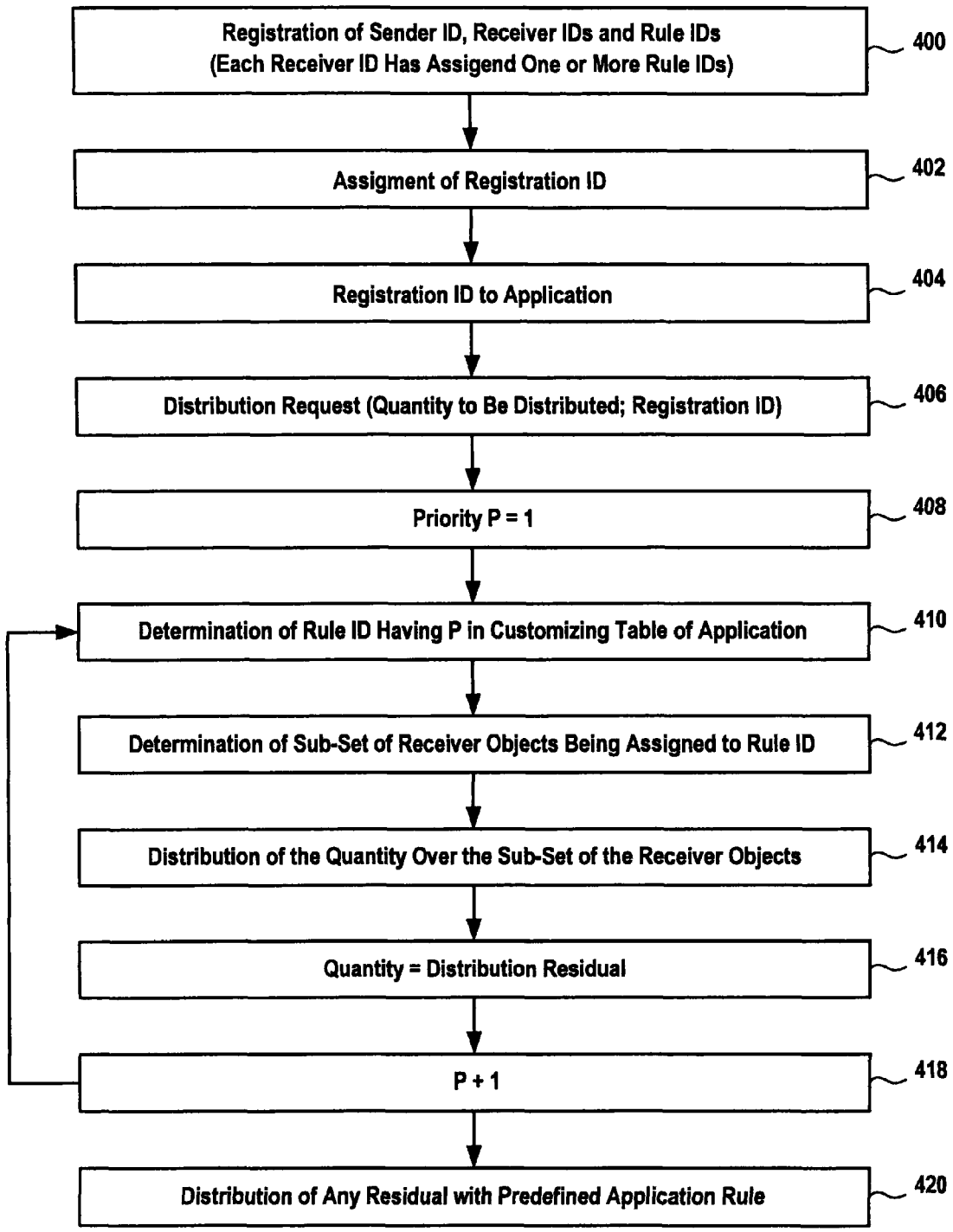
FIG. 4 is a flowchart illustrating an exemplary method, consistent with an embodiment of the present invention.

FIG. 4 shows a flowchart illustrating an exemplary method, consistent with an embodiment of the present invention. In step 400, a registration phase may be initiated. Each application program that requires distribution calculation performs such a registration by providing the sender object ID, receiver object IDs and rule IDs to the distribution calculation framework. Preferably, each receiver ID has assigned one or more rule IDs. In addition, at least some of the rules identified by the application program at least partly parameterized in the registration phase by storing fixed parameter values. In step 402, a registration ID is assigned and communicated back to the application program (step 404). This concludes the registration phase.

In step 406 a distribution request may be received from one of the application programs. The distribution request contains a numerical quantity that is to be distributed and the registration ID of the previously performed registration for the requesting application program.

In order to calculate the requested distribution over the receiver objects identified in the application programs registration, the following steps may be performed:

In step 408, the priority P is set to "1" in order to start processing with the highest priority rule contained in the registration. In step 410, the rule ID having the priority P is determined by means of the customizing table of the requesting application program (cf. customizing table 106 of FIG. 1). In step 412, a sub-set of receiver objects is determined from the receiver objects contained in the application program registration. The sub-set contains those receiver objects that are assigned to the rule ID determined in step 410.

In step 414, the rule being identified by the rule ID determined in step 410 is executed with respect to the sub-set of receiver objects determined in step 412 in order to distribute the quantity over this sub-set of the receiver objects. As a result of the distribution calculation performed in step 414 there can be a distribution residual that has not yet been distributed to any of the receiver objects. This distribution residual is set to be equal to the quantity to be distributed in step 416. In step 418, the priority "P" is incremented for the next iteration of the distribution processing. From there the control goes back to step 410. The steps 410 to 418 may be carried out repetitively until the lowest priority rule contained in the registration of the requesting application program has been executed.

After the distribution has been calculated there might be a residual of the quantity that has not been distributed due to rounding errors or due to other inaccuracies of the numeric calculation. Such a residual, if any, may be distributed in step 420 by means of the respective inaccuracy assignment rule assigned to the requesting application (cf. table 107 of FIG. 1).

The exemplary method of FIG. 4 can be employed for various distribution calculation tasks. For example, the quantity can be representative of a cost value to be distributed over a number of cost centers or products.

In one application, the price of an integrated circuit chip is calculated that is produced by a wafer fab controlled by the manufacturing control system 112 (cf. FIGS. 1, 2 and 3). The wafer fab produces a first class of chips that are operable at a first frequency, and a second class of chips that are operable at a second frequency, wherein the second frequency is above the first frequency. One of the application programs uses the distribution calculation hub to obtain a distribution of the production costs over the produced chips depending on the quality class to which a given chip belongs. For example, is fixed amount of the total cost is put on each chip irrespective of its quality (rule "Fixed"). The remainder of the total cost is distributed in accordance with the "Equivalence" Rule, whereby the higher quality class chips have a higher Equi parameter.

Other embodiments of the invention will be apparent to those skilled in the art from consideration of the specification and practice of the embodiments of the invention disclosed herein. It is intended, therefore, that the specification and examples be considered as exemplary only, with a true scope and spirit of the invention being indicated by the following claims.

What is claimed is:

1. A data processing system for calculating a distribution of a quantity over a plurality of receiver objects, the data processing system comprising:
   a plurality of application programs adapted to generate a distribution request;
   a storage means for storing:
      a plurality of rules adapted for distribution of at least a portion of the quantity over the receiver objects; and
      assignments of sub-sets of the plurality of rules to the application programs, the rules of the assigned sub-sets having:
         identifiers associating the rules of the assigned sub-sets with an application program;
         assigned priorities of execution; and
   distribution calculation means for:
      receiving a distribution request from one of the application programs, the received distribution request comprising:
         the identifier of the sub-set of rules assigned to the one of the application programs,
         the quantity to be distributed, and
         identifiers of receiver objects over which the quantity is to be distributed,
      the distribution calculation means being adapted to access the storage means in order to execute the sub-set of rules assigned to the one of the application programs, the execution in the order of the priorities assigned to the rules within the sub-set of rules assigned to the one of the application programs; and
   where the rules are parameterizable;
   wherein at least a sub-set of the parameters of one of the rules is assigned parameter values when the assignment of the sub-set of rules to an application program is stored.

2. The data processing system of claim 1, wherein the distribution means is adapted to request parameter values from the one of the application programs in response to the distribution request.

3. The data processing system of claim 1, further comprising a manufacturing control system.

4. The data processing system of claim 3, wherein the quantity is representative of a manufacturing resource to be distributed over manufacturing receiver objects.

5. The data processing system of claim 1, wherein the quantity is representative of a cost value.

6. The data processing system of claim 5, wherein the receiver objects are cost centers.

7. The data processing system of claim 5, wherein the receiver objects are at least first and second products.

8. The data processing system of claim 7, wherein the first product is an integrated circuit chip operable at a first frequency, and the second product is an integrated circuit chip operable at a second frequency, and further wherein the second frequency is above the first frequency.

9. A method of calculating a distribution of a quantity over a plurality of receiver objects on request of an application program of a plurality of application programs, the method comprising:
   storing:
      a plurality of rules adapted for distribution of at least a portion of the quantity over the receiver objects; and
      assignments of sub-sets of the stored rules to the application programs, the assigned sub-sets having an identifier and the rules of the assigned sub-sets having an assigned priority of execution;
   receiving a distribution calculation request from the one of the application programs, the distribution calculation request comprising:
      the identifier of the sub-set of rules assigned to the one of the application programs,
      a first identifier of a first receiver object,
      a second identifier of a second receiver object, and
      a numerical value of the quantity to be distributed over the receiver objects; and
   executing the rules in the sub-set of rules assigned to the one of the application programs in the order of the assigned priority of execution; and where the rules are parameterizable;
   wherein at least a sub-set of the parameters of one of the rules is assigned parameter values when the assignment of the sub-set of rules to an application program is stored.

10. The method of claim 9, wherein at least some of the rules are parameterizable and the rules of the sub-set of rules are at least partly parameterized.

11. The method of claim 9, further comprising:
   requesting one or more parameter values from the one of the application programs in response to the distribution calculation request.

12. The method of claim 9, wherein the quantity is a manufacturing resource to be distributed over manufacturing receiver objects.

13. The method of claim 9, wherein the quantity is a cost value.

14. A non-transitory computer-readable medium comprising computer executable instructions for performing a method for calculating a distribution of a quantity over a plurality of receiver objects on request of an application program of a plurality of application programs, the method comprising:
   storing:
      a plurality of rules adapted for distribution of at least a portion of the quantity over receiver objects; and
      an assignment of a sub-set of the stored rules for the application programs, the assigned sub-sets having an identifier and the rules of the assigned sub-sets having an assigned priority of execution;
   receiving a distribution calculation request from one of the application programs comprising:
      the identifier of the sub-set of rules assigned to the one of the application programs,
      a first identifier of a first receiver object,
      a second identifier of a second receiver object, and
      a numerical value of the quantity to be distributed over the receiver objects identified in the distribution calculation request; and
   executing the rules in the sub-set of rules assigned to the one of the application programs in the order of the assigned priority of execution; and
   where the rules are parameterizable;
   wherein at least a sub-set of the parameters of one of the rules is assigned parameter values when the assignment of the sub-set of rules to an application program is stored.

15. The non-transitory computer-readable medium of claim 14, the method further comprising:
   requesting one or more parameter values from the application program in response to the distribution calculation request.

* * * * *